June 9, 1925.

A. G. PARK

TIRE GAUGE

Filed Oct. 1, 1924

Abraham G. Park
INVENTOR

BY Victor J. Evans
ATTORNEY

WITNESS

June 9, 1925. 1,541,750
A. G. PARK
TIRE GAUGE
Filed Oct. 1, 1924   4 Sheets-Sheet 2
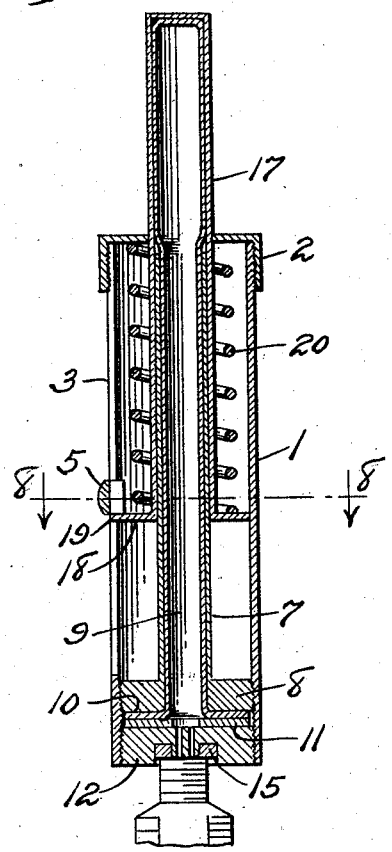
Fig. 5.
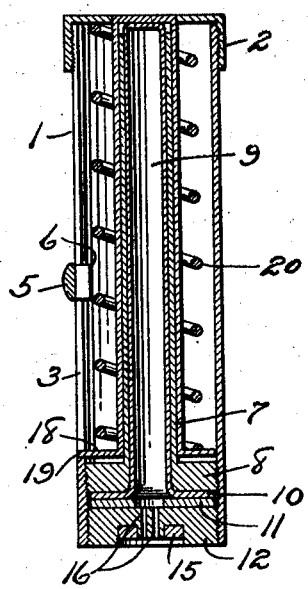
Fig. 6.
Fig. 8.
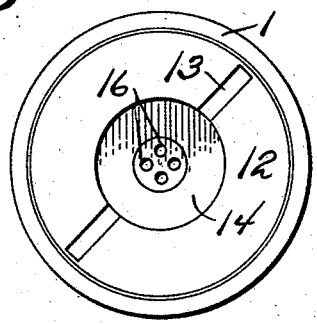
Fig. 7.
Abraham G. Park
INVENTOR
ATTORNEY
WITNESS:

June 9, 1925.  1,541,750
A. G. PARK
TIRE GAUGE
Filed Oct. 1, 1924    4 Sheets-Sheet 3

Abraham G. Park
INVENTOR
BY Victor J. Evans
ATTORNEY

WITNESS

June 9, 1925.

A. G. PARK

TIRE GAUGE

Filed Oct. 1, 1924

Abraham G. Park
INVENTOR

BY Victor J. Evans
ATTORNEY

WITNESS:

Patented June 9, 1925.

1,541,750

UNITED STATES PATENT OFFICE.

ABRAHAM G. PARK, OF BALTIMORE, MARYLAND.

TIRE GAUGE.

Application filed October 1, 1924. Serial No. 741,002.

*To all whom it may concern:*

Be it known that I, ABRAHAM G. PARK, a citizen of the United States, residing at Baltimore, in the county of Baltimore City and State of Maryland, have invented new and useful Improvements in Tire Gauges, of which the following is a specification.

This invention relates to a pressure indicating gauge which is mainly designed for indicating the air pressure in pneumatic tires and for indicating the compression in a combustion chamber of an internal combustion engine, the general object of the invention being to provide an inflatable member which is expanded by the pressure, a spring pressed member which is actuated by the inflatable member and has means associated therewith for indicating the degrees of pressure and means for protecting the inflatable member from the spring and other parts.

Another object of the invention is to provide means whereby the same device can be used on a tire or with an internal combustion engine.

Another object of the invention is to provide means whereby the device can be used in a horizontal position or in a vertical position.

A further object of the invention is to provide means for preventing a vacuum or a suction occurring in the air chamber of the device.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 5 is a section on line 5—5 of Figure 1.

Figure 6 is a view similar to Figure 5 but showing the parts returned to normal position after the indicator member has been raised.

Figure 7 is a bottom plan view.

Figure 8 is a section on line 8—8 of Figure 5.

Figure 1:
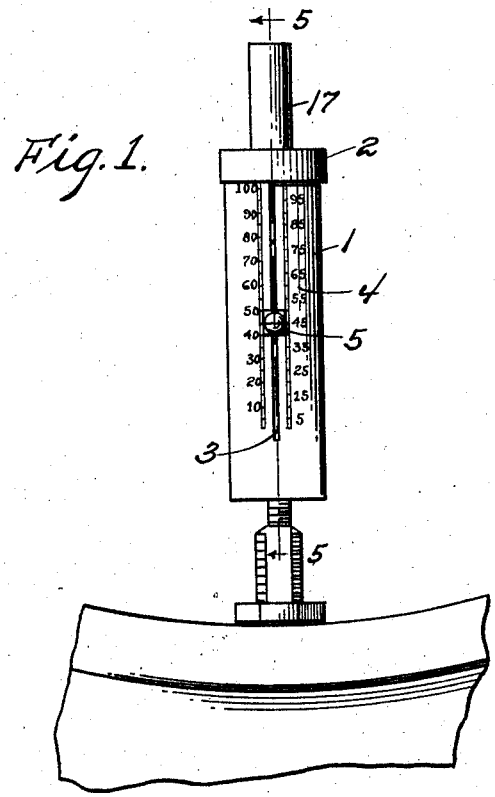
Figure 1 is a view showing one form of the device in use upon a tire.

In the first form of the invention the device consists of a casing 1 having its upper end closed by a screw cap 2 which is provided with a central opening and its lower end provided with internal screw threads. The casing is provided with a longitudinally extending slot 3 and has scales 4 thereon at the sides of the slot. An indicator block 5 cooperates with the scales and is frictionally held in the slot by the spring arms 6 which pass through the slot and engage the inner wall of the casing. This block will remain in any position to which it has been moved. A tubular member 7 is placed in the casing and is held therein by its head 8 being threaded to engage the internal threads in the lower end of the casing. An inflatable member 9 of tubular shape and preferably formed of rubber is placed in the member 7 and has a flange 10 thereon which rests upon the head 8. A washer 11 is seated upon the flange 10 and a plug 12 is screwed into the casing and presses upon the washer to clamp the flange of the inflatable member between the washer and the head 8. This plug is provided with a kerf 13 so that it may be screwed into place by a suitable tool and its center is recessed, as at 14, to receive a gasket 15, the central part of the recess being of less depth and a number of holes 16 pass through the center of the plug and communicate with the hole in the washer which is in register with the interior of the inflatable member 9. A tubular member 17 is located within the casing and encloses the member 7 and has its outer end closed and a flange 18 is formed on its inner end which snugly fits the casing and has a lip 19 thereon which extends into the slot 3 of the casing. This member 17 is adapted to pass through the hole in the cap when it is raised. A spring 20 encircles the member 17 and has one end pressing against the cap and the other end against the flange 18.

From the foregoing it will be seen that when the device is placed on a valve stem, as shown in Figures 1 and 5, with the gasket 15 engaging the screw threaded end of the stem the portion of the plug between the holes 16 will engage the valve pin of the stem and thus open the valve so that air can pass from the tube of the tire through the hole 16 and the hole in the washer into the inflatable member 9. As the inflatable member is held against movement laterally by being enclosed by the member 7 it must elongate which will raise the member 17, as shown in Figures 1 and 5. This raising movement of the member 17 will compress the spring 20 and its lip 19 encountering the block 5 will raise said block and thus the amount of pressure in the tire will be indicated by the block and the scales. When the device is removed from the valve stem the spring 20 will return the member 17 to its normal position and the inflatable member will return to its normal position, as shown in Figure 6, though the block will remain in the position to which it has been moved by the lip 19. Thus the pressure can be read after the device has been removed from the stem. The block is then pushed back to the bottom of the slot by hand. As will be seen the inflatable member is protected by the tubular members and it cannot engage the spring. The compressed air remains in the inflatable member and does not enter the casing at all so that the same can be slotted for holding the indicating member.

Figure 2:
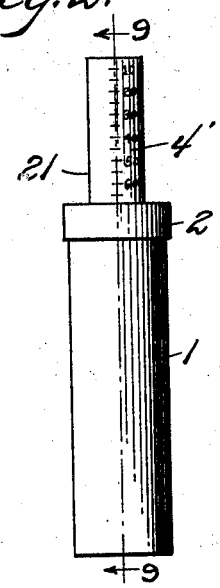
Figure 2 is a view of a slightly different form of the device.
Figure 9:
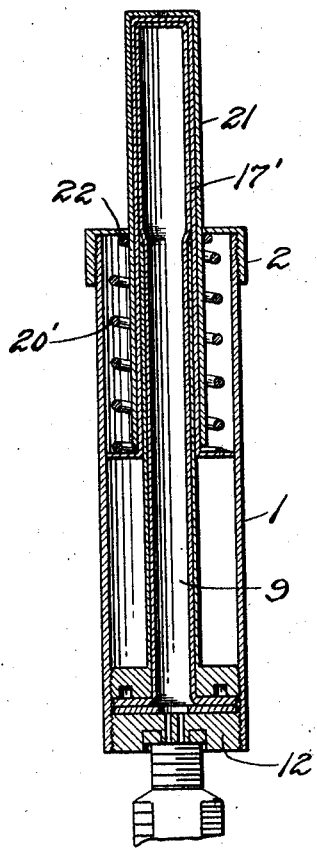
Figure 9 is a section on line 9—9 of Figure 2.
Figure 10:
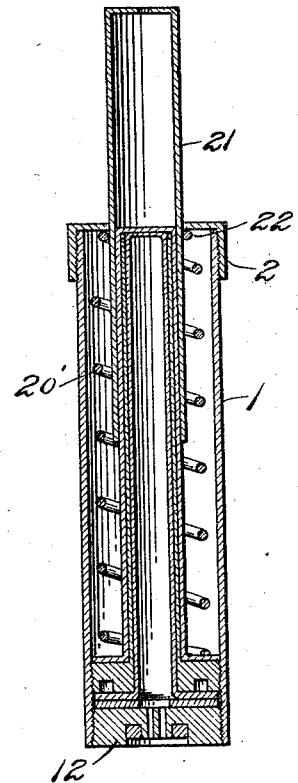
Figure 10 is a similar view but showing the inflatable member and spring actuated member returned to normal position.

Instead of using the block and scale as just described I may use another tubular member such as shown at 21 in Figures 2 and 9 which encloses the member 17' and which is frictionally held in adjusted position by means of the upper coil 22 of the spring 20. The scale is carried by this member, as shown at 4' in Figure 2. Thus when the inflatable member elongates it will raise the member 17' as before explained and this movement of the member 17' will be communicated to the member 21 so that the same is raised, as shown in Figures 2 and 9 so that the scale thereon will indicate the degree of pressure. When the device is removed from the valve stem the spring will return the parts to normal position but the member 21 will remain raised, due to its frictional engagement by the coil 22 of the spring 20', as shown in Figure 10, so that the pressure can be ascertained without leaving the device on the stem. This construction eliminates the slot, the block and the scale on the casing.

Figure 3:
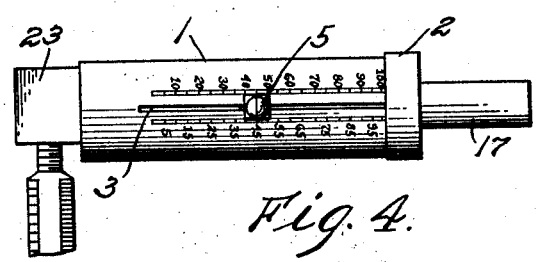
Figure 3 is a view of the device shown in Figure 1 but having an attachment whereby it can be used in a horizontal position.
Figure 4:
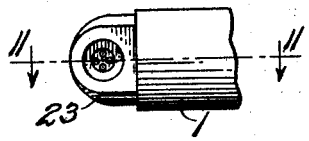
Figure 4 is a fragmentary view of the device shown in Figure 3.
Figure 11:
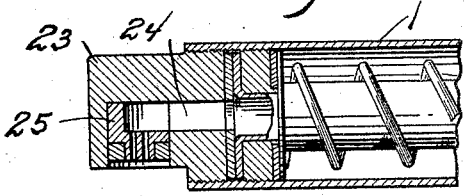
Figure 11 is a section on line 11—11 of Figure 4.

Figures 3, 4 and 11 show an adaptor block 23 threaded in the lower end of the casing and having an L-shaped passage 24 therein, in the outer end of which is placed a perforated member 25, so that the device can be used in a horizontal position, as shown in Figure 3. In other respects this form of the invention is similar to that before described.

Figure 12:
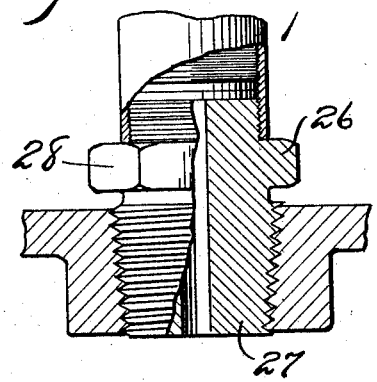
Figure 12 is a view showing an attachment on the device so that the same can be placed in the spark plug hole of an internal combustion engine.

Figure 12 shows an adaptor 26 threaded in the lower end of the casing and having a threaded part 27 and a wrench engaging part 28, the threaded part 27 being adapted to be threaded into the spark plug hole of an internal combustion engine so that the device can be used for ascertaining the degree of compression of the explosive charge in a cylinder of the motor.

In order to prevent a vacuum being formed in the air chamber of the device when used with an internal combustion engine I thread a block 29 in the adaptor 26' and said block has a passage 30 therein which is controlled by a valve 31, this valve being normally held closed by a spring 32 engaging a part on the stem of the valve. A bracket 33 is fastened to the block and a tubular guide 34 is carried by said bracket and extends into the inflatable member 9' of the device. A rod 35 is slidably supported by said guide 34 and the bracket and extends into the inflatable member and has a head 36 on its upper end. Its lower end extends into an opening 37 in the block 29 and an arm 38 is fastened to the rod and has one end notched to engage a part of the bracket, which prevents turning movement of the arm and its other end is also notched to receive the valve stem. A projection 39 is carried by the valve stem and engages the upper face of the arm. A spring 40 is arranged around the lower part of the rod 35 and bears against the plug 29 and the arm 38 and tends to hold the arm in its upper position with the rod raised.

Figure 13:
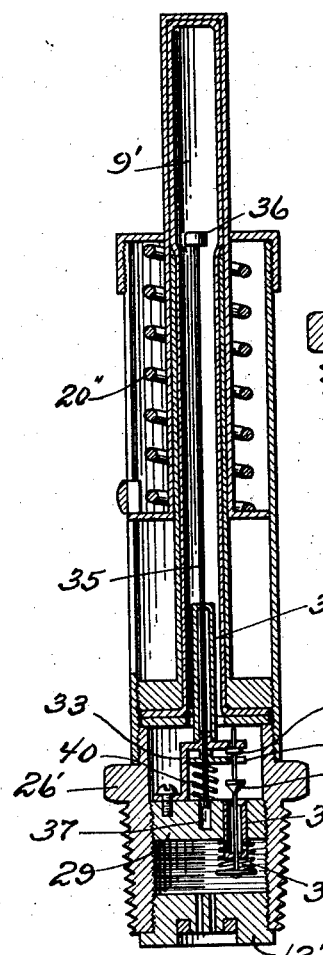
Figure 13 is a sectional view showing a modification.
Figure 14:
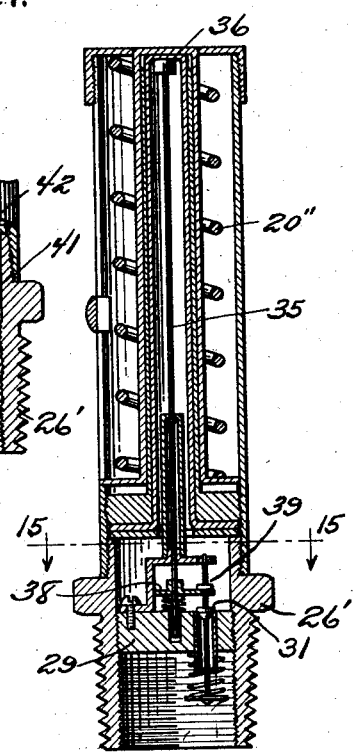
Figure 14 is a view similar to Figure 13 but showing the parts as returned to normal position with the indicator member in set position.

In this construction when the parts are in lowered position, as in Figure 14, the inflatable member will rest upon the head 36 so that the rod 35 and its arm are depressed and the spring 32 can close the valve 31. When a pressure occurs in the chamber of the adaptor 26', the valve 31 will be forced upwardly so that the compressed fluid will enter the air chamber of the device and thus elongate the inflatable member, as before explained. This will free the rod 35 so that its spring 40 will raise the same and the arm 38 to the position shown in Figure 13 which will hold the valve 31 open. On the return stroke of the piston of the motor the air is drawn from the chamber of the device which will cause the inflatable member 9' and its associated parts to return to normal position and these parts will cause the rod 35 to move downwardly so that its arm 38 will permit the valve 31 to close under the action of the spring 32 and thus prevent a vacuum being formed in the device.

Figure 17:
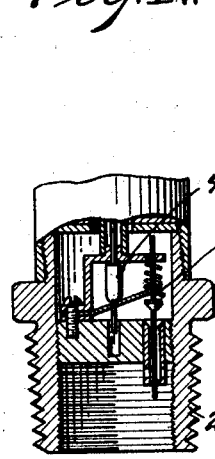
Figure 17 is a sectional view showing a slight modification from that shown in Figures 13 and 14.
Figure 16:
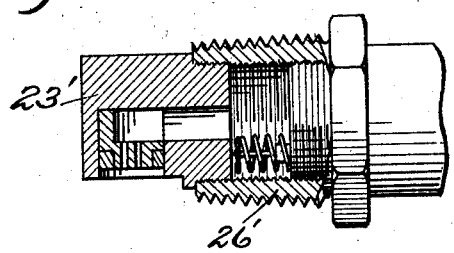
Figure 16 is a view showing an adaptor applied to the device so that it can be used in a horizontal position.
Figure 15:
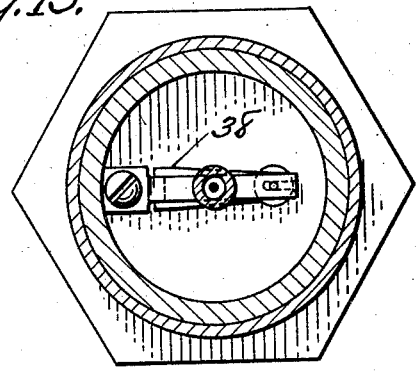
Figure 15 is a section on line 15—15 of Figure 14.

Figure 17 shows a leaf spring 41 used in place of the spring 40 for holding the rod in its upper position and this spring also takes the place of the arm 38 as its extremity engages the stop on the valve stem. This spring engages an enlargement 42 on the rod which also acts to limit the movement of the rod and prevents its lower end from coming out of the hole in the block. In other respects this form of the invention is similar to that just described. In order to permit the same device to be used on a valve stem or on a motor I may place a block 12' at the lower end of the adaptor 26' which is fitted to rest upon a valve stem and to open the valve thereof. Figure 16 shows an adaptor 23' inserted in an adaptor similar to that shown at 6' so that this type of device can be used in a horizontal position.

When the device is used for ascertaining the degree of compression in a cylinder it will also indicate the duration of this compression and if the compression escapes due to leaky rings the parts will return to normal position and thus the extent of leak can be determined by the amount of time it takes the parts to move back to normal position. This is not true of the device shown in Figures 2 and 9.

From the foregoing it will be seen that I have provided a simple device for ascertaining the pressures in pneumatic tires and in the cylinders of motors. The inflatable member is protected from contact with the spring and other parts so that it will last for some time. It has great freedom of action which allows a wide latitude of air pressures and as the pressure does not enter the outer casing the same can be slotted to receive the registering means. By using the different adaptors the device can be used with the various types of tires and wheels as well as placed in the spark plug holes of motors.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A gauge of the class described comprising a casing, a tubular member mounted therein having both ends open, an inflatable member arranged within the tubular member and having its lower end open and its upper end closed, means for holding the inflatable member in position, such means being perforated to admit pressure to the inflatable member, a second tubular member enclosing the first mentioned tubular member and having its end closed and covering the closed end of the inflatable member, a spring within the casing for resisting movement of the second mentioned tubular member and indicating means associated with said second member.

2. A gauge of the class described comprising a casing, a cap closing one end of the same and having an opening therein, a tubular member within the casing having an enlarged head threaded to the interior wall of the casing, a resilient tubular member arranged within the first member and having a flange engaging the head thereof, a plug threaded in the casing, a washer between the plug and the flange of the tubular member, said plug having perforations therein for permitting pressure to enter the resilient member, a second tubular member enclosing a part of the first mentioned tubular member and having its upper end closed and covering the end of the resilient member, a flange on its lower end within the casing, a spring encircling the last mentioned member and resting upon the flange and the cap and indicating means associated with the last mentioned tubular member.

3. A gauge of the class described comprising a casing, a cap closing one end of the same and having an opening therein, a tubular member within the casing having an enlarged head threaded to the interior wall of the casing, a resilient tubular member arranged within the first member and having a flange engaging the head thereof, a plug threaded in the casing, a washer between the plug and the flange of the tubular member, said plug having perforations therein for permitting pressure to enter the resilient member, a second tubular member enclosing a part of the first mentioned tubular member and having its upper end closed and covering the end of the resilient member, a flange on its lower end within the casing, a spring encircling the last mentioned member and resting upon the flange and the cap, indicating means associated with the last mentioned tubular member and adaptors for enabling the device to be used in horizontal position or to be used to ascertain the pressure within the cylinder of a motor vehicle.

4. A gauge of the class described comprising a casing, a cap closing one end of the same and having an opening therein, a tubular member within the casing having an enlarged head threaded to the interior wall of the casing, a resilient tubular member arranged within the first member and having a flange engaging the head thereof, a plug threaded in the casing, a washer between the plug and the flange of the tubular member, said plug having perforations therein for permitting pressure to enter the resilient member, a second tubular member enclosing a part of the first mentioned tubular member and having its upper end closed and covering the end of the resilient member, a flange on its lower end within the casing, a spring encircling the last mentioned tubular member and resting upon the flange and the cap, indicating means associated with the last mentioned member and adaptors for enabling the device to be used in horizontal position or to be used to ascertain the pressure within the cylinder of a motor vehicle and means associated with the adaptor for the motor for preventing a vacuum occurring in the device.

5. A gauge of the class described comprising a casing, a cap closing one end of the same and having an opening therein, a tubular member within the casing having an enlarged head threaded to the interior wall of the casing, a resilient tubular member arranged within the first member and having a flange engaging the head thereof, a plug threaded in the casing, a washer between the plug and the flange of the tubular member, said plug having perforations therein for permitting pressure to enter the resilient member, a second tubular member enclosing a part of the first mentioned tubular member and having its upper end closed and covering the end of the resilient member, a flange on its lower end within the casing, a spring encircling the last mentioned tubular member and resting upon the flange and the cap, indicating means associated with the last mentioned member and adaptors for enabling the device to be used in horizontal position or to be used to ascertain the pressure within the cylinder of a motor vehicle, means associated with the adaptor for the motor for preventing a vacuum occurring in the device, such means comprising a normally closed valve, a member for holding the valve in open position and means for rendering the member inactive when the gauge parts are in normal position.

In testimony whereof I affix my signature.

ABRAHAM G. PARK.